United States Patent
Li et al.

(10) Patent No.: US 8,416,314 B2
(45) Date of Patent: Apr. 9, 2013

(54) METHOD AND SYSTEM FOR PROCESSING IMAGES

(75) Inventors: Kai Li, Shenzhen (CN); Yuan Liu, Shenzhen (CN)

(73) Assignee: Huawei Device Co., Ltd., Shenzhen (CN)

(*) Notice: Subject to any disclaimer, the term of this patent is extended or adjusted under 35 U.S.C. 154(b) by 249 days.

(21) Appl. No.: 12/860,339

(22) Filed: Aug. 20, 2010

(65) Prior Publication Data
US 2010/0315512 A1    Dec. 16, 2010

Related U.S. Application Data

(63) Continuation of application No. PCT/CN2009/070583, filed on Feb. 27, 2009.

(30) Foreign Application Priority Data

Mar. 5, 2008  (CN) .......................... 2008 1 0082736

(51) Int. Cl.
*H04N 5/228*   (2006.01)
*H04N 17/00*   (2006.01)
*G06K 9/46*    (2006.01)

(52) U.S. Cl.
USPC ................... 348/222.1; 348/175; 382/190

(58) Field of Classification Search ............. 348/207.99, 348/222.1, 175, 180, 239, 188; 382/190, 382/191, 194, 181, 276, 173
See application file for complete search history.

(56) References Cited

U.S. PATENT DOCUMENTS

| | | | |
|---|---|---|---|
| 6,768,509 B1 | 7/2004 | Bradski et al. | |
| 6,956,779 B2 | 10/2005 | Tran | |
| 7,133,571 B2* | 11/2006 | Cheatle | 382/173 |
| 7,330,219 B2 | 2/2008 | Satoh et al. | |
| 2004/0141206 A1 | 7/2004 | Kim | |
| 2005/0047656 A1* | 3/2005 | Luo et al. | 382/181 |
| 2005/0185223 A1 | 8/2005 | Takahashi et al. | |
| 2006/0023077 A1* | 2/2006 | Alton et al. | 348/222.1 |
| 2006/0114327 A1* | 6/2006 | Araya et al. | 348/207.99 |
| 2007/0127773 A1 | 6/2007 | Ogawa | |
| 2008/0316327 A1* | 12/2008 | Steinberg et al. | 348/222.1 |
| 2010/0259624 A1 | 10/2010 | Li et al. | |
| 2011/0080616 A1* | 4/2011 | Yang et al. | 382/167 |

FOREIGN PATENT DOCUMENTS

| | | |
|---|---|---|
| CN | 1517833 A | 8/2004 |
| CN | 1567370 A | 1/2005 |
| CN | 1645899 A | 7/2005 |

(Continued)

OTHER PUBLICATIONS

International Search Report, International application No. PCT/CN2009/070583, Date of mailing of the international search report Jun. 11, 2009, 4 pages.

(Continued)

*Primary Examiner* — Aung S Moe
(74) *Attorney, Agent, or Firm* — Slater & Matsil, LLP

(57) ABSTRACT

A method for processing images includes: obtaining video images or capturing a series of images in real time; detecting difference between two adjacent images, and reserving one of the images when the difference is less than a preset threshold; detecting feature information of the obtained images; and performing definition-related treatment for the images detected as having the feature information, comparing definition of each image with a preset definition criterion, and reserving clear images.

13 Claims, 14 Drawing Sheets

FOREIGN PATENT DOCUMENTS

| | | |
|---|---|---|
| CN | 1257443 C | 5/2006 |
| CN | 1949271 A | 4/2007 |
| CN | 101419705 A | 4/2009 |
| CN | 101527040 A | 9/2009 |
| GB | 2 195 214 A | 3/1988 |

OTHER PUBLICATIONS

Zhang, Z., "A Flexible New Technique for Camera Calibration," IEEE Transactions on Pattern Analysis and Machine Intelligence, vol. 22, No. 11, Nov. 2000, 5 pages.

Sun, Y., et al., "Autofocusing Algorithm Selection in Computer Microscopy," IEEE/RSJ International Conference on Intelligent Robots and Systems (IROS 2005), Aug. 2-6, 2005, 7 pages.

Written Opinion of the International Searching Authority, International Application No. PCT/CN2009/070583, Applicant: Shenzhen Huawei Communication Technologies Co., Ltd., et al., Date of mailing: Jun. 11, 2009, 6 pages.

Chinese Office Action, Chinese Application No. 200810082736.2, Dated: Oct. 27, 2010, 16 pages.

European Office Action, European Application No. 09718449.3, Feb. 16, 2012, 6 pages.

Lim, A., et al., "Image Resolution and Performance Analysis of Webcams for Ground Based Astronomy," Proc of SPIE, vol. 5489, 2004, pp. 1152-1163.

McBride, J., et al., "Single Camera Stero for Mobile Robot Surveillance," Proceedings of the 2005 IEEE Computer Society Conference on Computer Vision and Pattern Recognition, 2005, 9 pages.

European Search Report, European Application No. 09718449.3-2218/2252088, PCT/CN2009070583, Dated: Mar. 24, 2011, 12 pages.

Second Chinese Office Action and Translation received in Chinese Patent Application No. 200810082736.2, mailed Feb. 16, 2012, 5 pages.

* cited by examiner

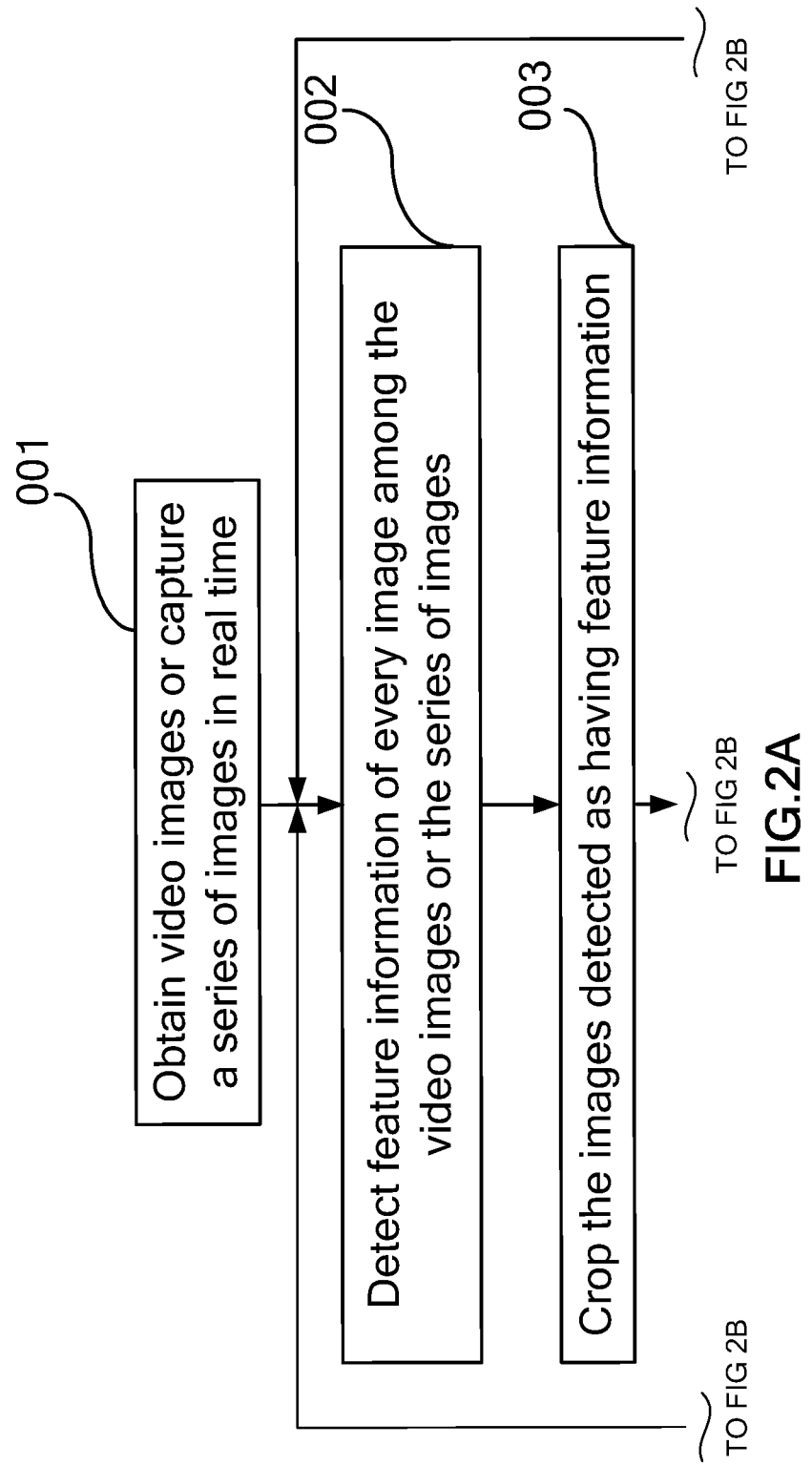

METHOD AND SYSTEM FOR PROCESSING IMAGES

This application is a continuation of co-pending International Application No. PCT/CN2009/070583, filed Feb. 27, 2009, which designated the United States and was not published in English, and which claims priority to Chinese Application No. 200810082736.2, filed Mar. 5, 2008, both of which applications are incorporated herein by reference.

TECHNICAL FIELD

The present invention relates to image processing technologies and, in particular embodiments, to a method and a system for processing images.

BACKGROUND

In a computer visual system, camera calibration is a process of obtaining geometric and optical features inside the camera, namely, internal parameters, and obtaining the three-dimensional location relation between the camera coordinate system and the space coordinate system, namely, approximation of external parameters.

No matter what camera calibration method is adopted, obtaining clear images automatically is a foundation of successful calibration. If the images are not clear, the calibration result is deteriorated.

In the process of developing the present invention, the inventor finds that the prior art does not define how to obtain clear images automatically. The image processing in the prior art requires the photographer to take photos from different perspectives, which brings inconvenience to the person who holds the image and to the photographer. In most circumstances, an image is obtained through cooperation of two persons. In practical experiment, using unclear images calibrating a camera leads to great errors of the calibration results or even failure of obtaining the calibration results. In the prior art, the photographer has to take multiple photos and select a clear and qualified image among them for detecting feature information, and the camera is unable to select a proper clear image automatically.

SUMMARY OF THE INVENTION

The embodiments of the present invention provide a method and a system for processing images to select a proper and clear image automatically among video files or a series of images and automate the calibration.

An image processing method disclosed according to a first aspect of the present invention includes obtaining video images or capturing a series of images in real time. A difference between two adjacent images is detected and one of the images is reserved when the difference is less than a preset threshold. Feature information of the obtained image is detected. Definition-related treatment is performed for the image detected as having the feature information. A definition of the image is compared with a preset definition criterion and a clear image is reserved.

An image processing system disclosed according to a second aspect of the present invention includes an image obtaining module that is adapted to obtain video images or capture a series of images in real time. An image difference detecting module is adapted to detect difference between two adjacent images, and reserve one of the images when the difference is less than a preset threshold. A feature information detecting module is adapted to detect feature information of the obtained video images or the series of images and obtain images that have distinct feature information. An image definition judging module is adapted to perform definition-related treatment for the images that have the feature information, compare definition of each image with a preset definition criterion, and, when a current image is unclear, discard the current image so that the image obtaining module continues to select a next image.

The embodiments of the present invention judge feature information and definition of a single image, and find the clear image that fulfills conditions automatically, without involving comparison between multiple images. Therefore, the images that need to be processed are reduced, image preprocessing can be performed for video files, and the subsequent video calibration is automated.

DETAILED DESCRIPTION OF ILLUSTRATIVE EMBODIMENTS

The technical solution under the present invention is elaborated below with reference to accompanying drawings and preferred embodiments.

Figure 1:
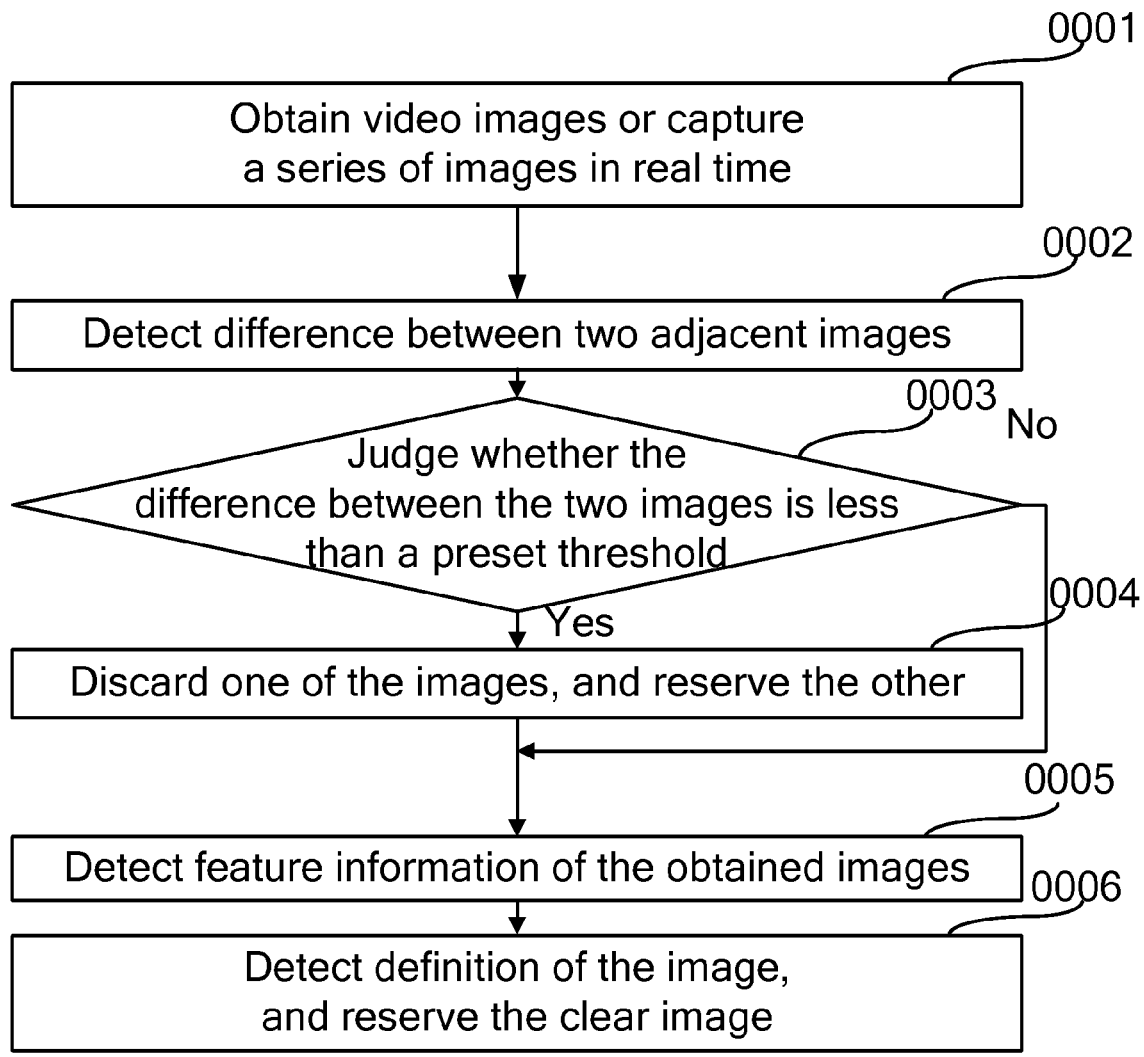
FIG. 1 is a flowchart of an image processing method in the first embodiment of the present invention.

FIG. 1 is a flowchart of an image processing method in the first embodiment of the present invention. As shown in FIG. 1, the method includes the following blocks.

Block 0001: Obtain video images or capture a series of images in real time.

Block 0002: Detect difference between two adjacent images.

Block 0003: Judge whether the difference between the two images is less than a preset threshold; if so, go to block 0004; if not, go to block 0005.

Block 0004: Discard one of the images, and reserve the other.

Block 0005: Detect feature information of the obtained image.

Block 0006: Perform definition detection for the images detected as having the feature information, compare definition of the images with a preset definition criterion, and reserve clear images.

The method in this embodiment processes obtained images, and discards one of two adjacent images if the difference between the two adjacent images is less than a preset threshold, thus ensuring distinct difference between obtained images and preventing multiple detected images from staying static. The method in this embodiment detects definition of every image among multiple distinctly different images, discards the unclear images, and ensures that the remaining images have distinct feature information, and are clear and mutually different. Nevertheless, in some circumstances, it is enough to obtain one image that meets the conditions. If operations related to camera calibration are performed after the image is obtained, some calibration methods require only one image, and other calibration methods require two or more images. The traditional camera calibration method requires at least two images. In theory, the automatic calibration of cameras requires only one image. Therefore, a certain number of clear images with feature information may be reserved as required.

Figure 2B:
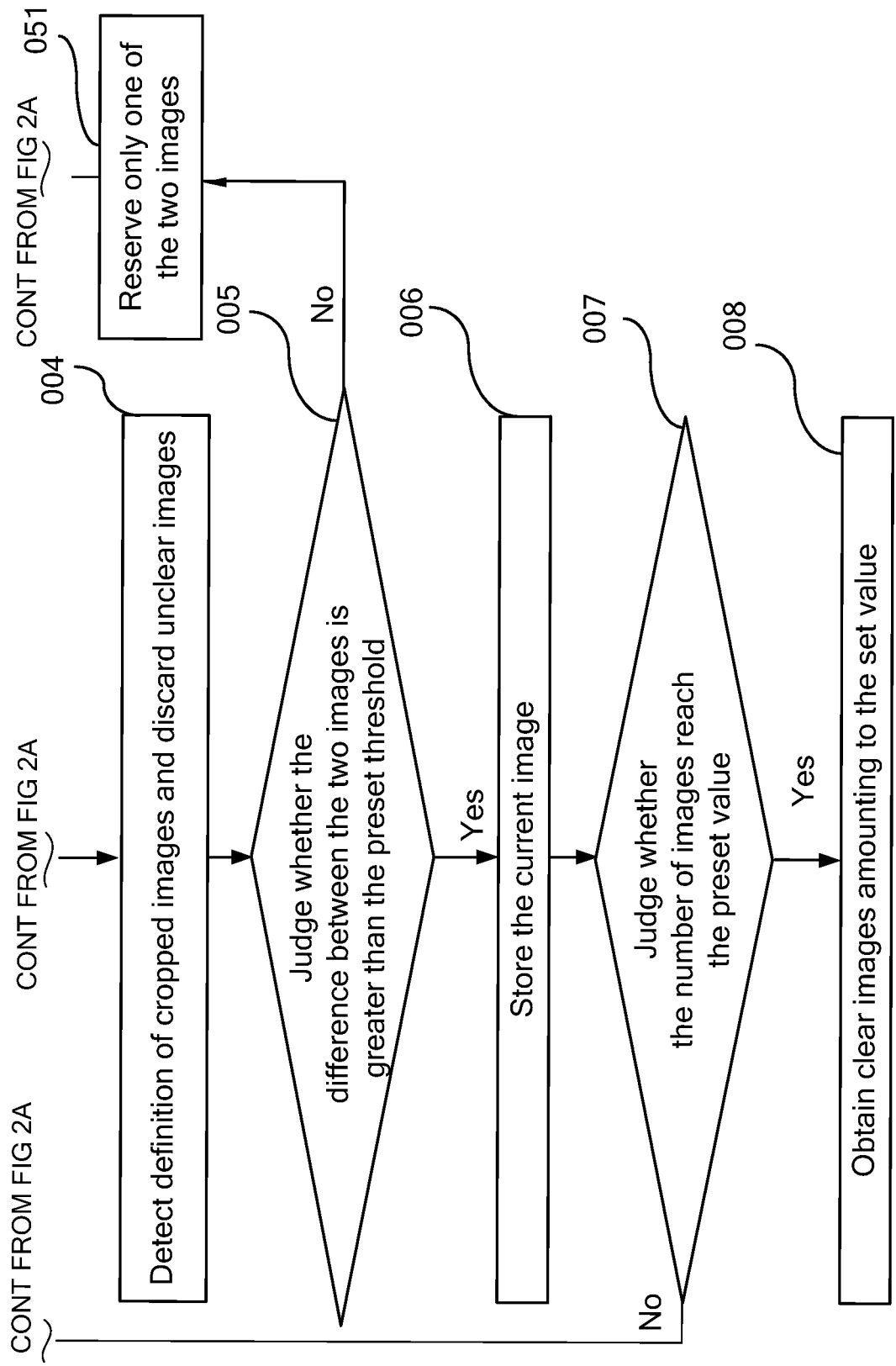
FIG. 2, which is shown as FIGS. 2A and 2B, is a flowchart of an image processing method in the second embodiment of the present invention.

FIG. 2 is a flowchart of an image processing method in the second embodiment of the present invention. The method includes the following blocks.

Block 001: Obtain video images or capture a series of images in real time.

Block 002: Detect feature information of an image among the video images or the series of frame images.

Block 003: Crop the image that is detected as having feature information.

Block 004: Perform definition detection for the cropped image (perform definition-related treatment, and compare definition of the image with a preset definition criterion), and discard the unclear image.

Block 005: Judge whether the difference between the current image and the previous image is greater than a preset threshold. If so, it means that the two images are distinctly different, and go to block 006. Otherwise, the two images are scarcely different and go to block 051 to prevent the detected scene from staying static.

Block 051: Because the two images are scarcely different, discard one of the images, reserve only one image for participating in the subsequent treatment, and go on to block 002 to read the next image.

Block 006: Store the current image.

Block 007: Judge whether the number of images reaches a preset value. For example, set the value to 3 because at least three different images are required for subsequent internal parameter operation in camera calibration or set the value to others such as 4 in order to reserve a redundancy. Go to block 008 when the number of images reaches a preset value or go to block 002 to read the next image if the number of images that meet the conditions is less than the preset value.

Block 008: Obtain clear images of the number according to the set value.

The method in this embodiment detects feature information of every image in a series of images obtained, crops the image, and judges definition of each image separately, namely, judges part with distinct feature information in an image is clear. The judgment about definition of an image is based on this image alone. In this embodiment, image cropping is performed to maximize the percentage of the detected image feature information to the whole image. For some images, the detected feature information is little, the percentage of the feature information to the whole image is small, and the image is not easy to process. After image cropping is performed, the unnecessary peripheral zone of the obtained image is removed, and the percentage of the feature information to the image is maximized to facilitate subsequent processing.

In the prior art, a series of images are obtained by photographing of the same scene, and the clearest image is found among the series of images. In the foregoing embodiment of the present invention, a single image is judged with respect to feature information and definition, and the clear image that conforms to conditions is found automatically, without involving comparison between multiple images. Therefore, the number of images that need to be processed is reduced, the subsequent calibration can be performed only after a certain number of qualified images are selected, and it is not necessary to process all images. The method provided in this embodiment can obtain clear valid images that have distinct feature information from the video files accurately, preprocess the video files, and automate the subsequent video calibration process. Moreover, because the video images or a series of frame videos can be processed automatically, one person is enough for processing the images and getting ready for subsequent calibration.

Figure 3A:
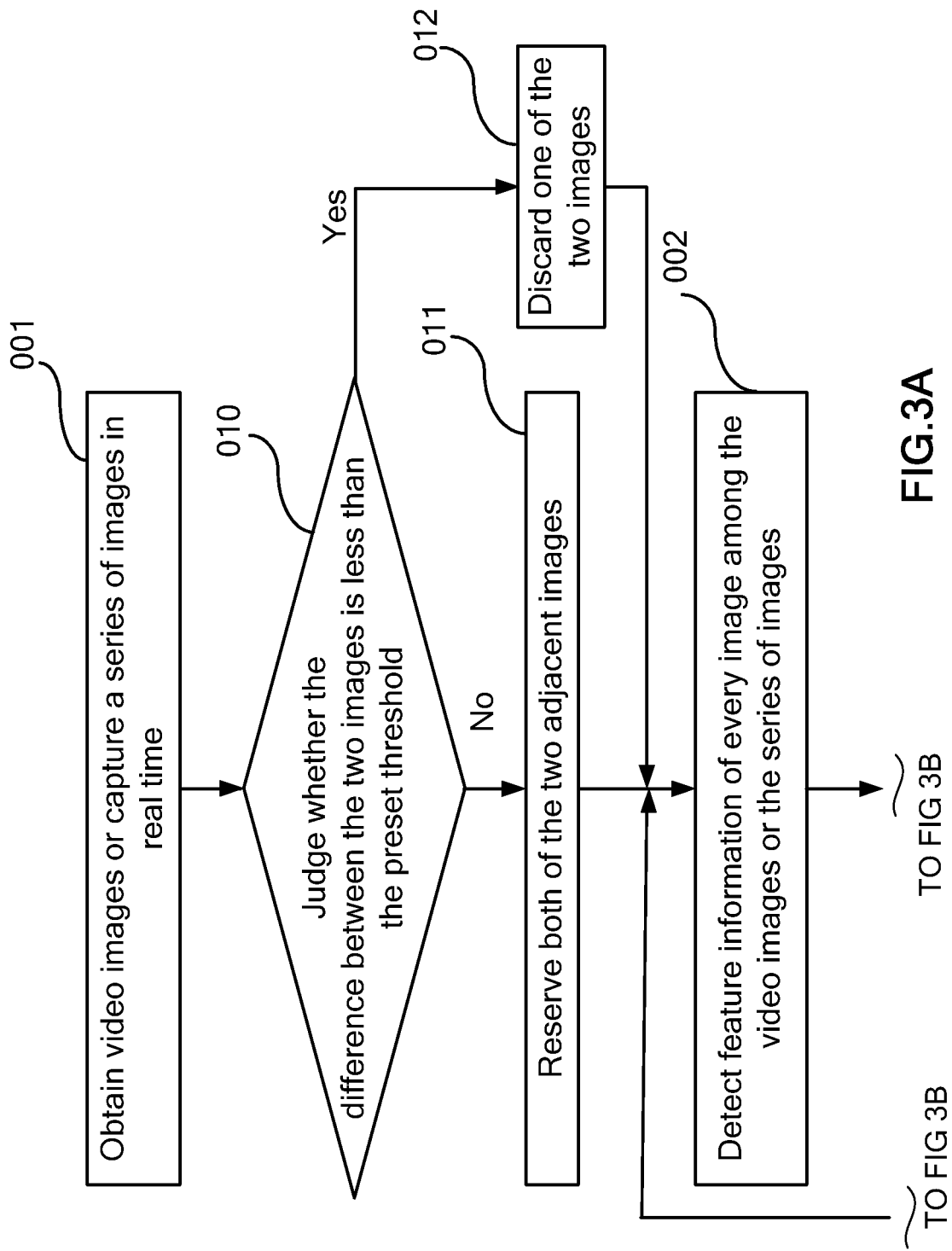
FIG. 3, which is shown as FIGS. 3A and 3B, is a flowchart of an image processing method in the third embodiment of the present invention.
Figure 3B:
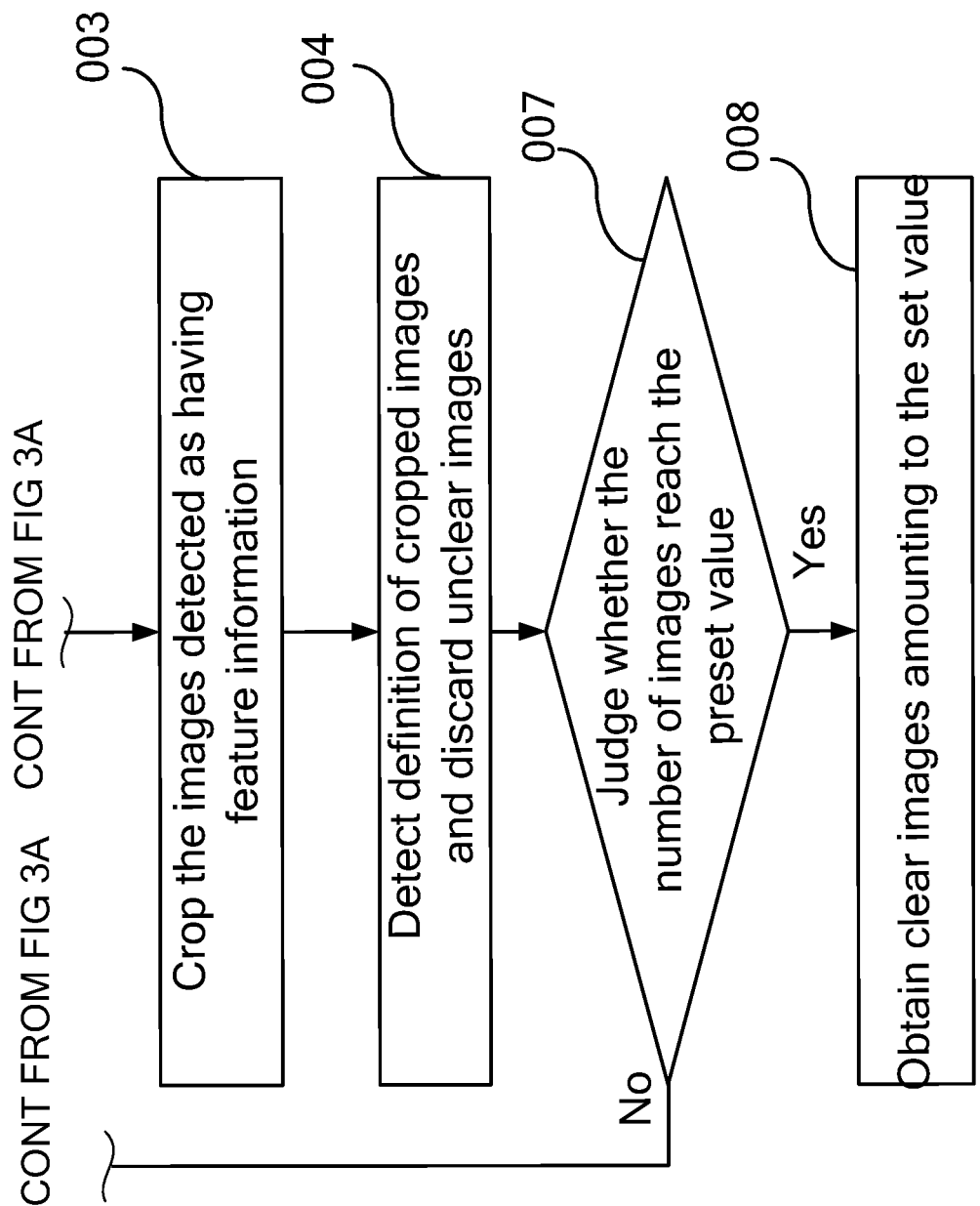

FIG. 3 is a flowchart of an image processing method in the third embodiment of the present invention. This embodiment is similar to the embodiment shown in FIG. 2, but differs in that after the images are obtained in block 001 and before the feature information of the images is detected in block 002, the following steps occur.

Block 010: Judge whether the difference between two adjacent images is greater than a preset threshold. If so, it means that the two images are distinctly different, and go to block 011. Otherwise, the two images are scarcely different and go to block 012 to prevent the detected scene from staying static.

Block 011: Store the two images, and go to block 002.

Block 012: Because the two images are scarcely different, discard one of the images, reserve only one image for participating in the subsequent treatment, and go to block 002.

In the embodiments elaborated in FIG. 1 to FIG. 3, the detection of a difference between two adjacent images may occur after the operation of detecting definition of the images (block 004 in the embodiment as shown in FIG. 2) or after the operation of obtaining the image (block 001 in the embodiment as shown in FIG. 3) or occur at the same time. A judgment is made about whether the two images are distinctly different. If the two images are distinctly different, the two adjacent images are reserved for undergoing subsequent detection and judgment. Otherwise, one of the two adjacent images is discarded.

In the prior art, multiple obtained images are compared, and the clearest image is found for performing subsequent calibration calculation. In the embodiments above, if two images obtained are not distinctly different, one of the images is discarded to prevent several images from staying static, and ensure distinct difference between the final images for calibration calculation and that definition requirements are met. For example, if there are ten images obtained by photographing or ten frames of a video image, but four of them are scarcely different, the detection and judgment operations can be performed only for the remaining six images, and the detection stops as long as the images of the preset number meeting the requirements are detected.

In this embodiment, several images that are unclear are discarded before any calibration calculation, and the obtained images of a set number are used to perform subsequent calibration. In the example given above, if the first three of the six detected images conform to requirements (such as feature information and definition), the last three images do not need to be processed; if two of the first three images in the six detected images conform to requirements (such as feature information and definition), it is necessary to detect the last three images, and the images of the preset number are finally obtained. In this way, three to six times of treatment are enough for completing the preprocessing. Compared with the prior art, this embodiment automates the detection and treatment. Moreover, because clear images of the set number are obtained after image preprocessing, calibration calculation can be performed subsequently according to the obtained images. Because the input images of the set number have feature information and are clear, the calibration-related parameter information can be calculated effectively. Compared with the prior art, the method provided in this embodiment quickens the treatment, saves time, and enables calculation of accurate parameter information in the subsequent calibration calculation.

Figure 4:
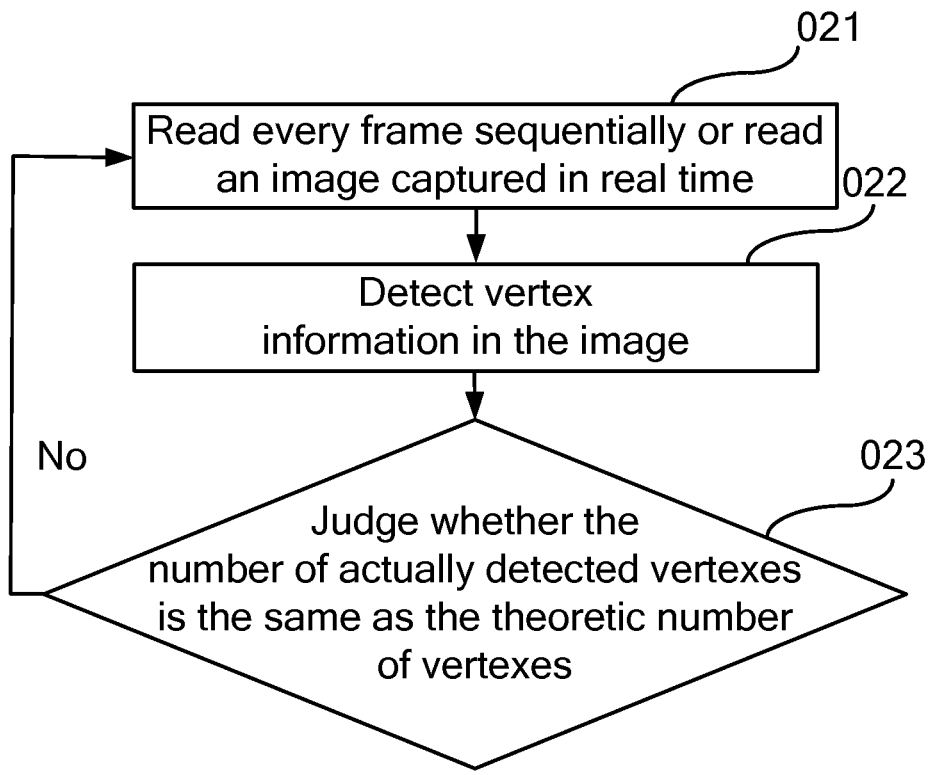
FIG. 4 is a flowchart of detecting feature information in an embodiment of the present invention.

FIG. 4 is a flowchart of detecting feature information in an embodiment of the present invention. As shown in FIG. 4, the detection of feature information in this embodiment includes the following blocks.

Block 021: Read every frame sequentially or read an image captured in real time.

Block 022: Detect vertex information in the image.

Block 023: Judge whether the number of actually detected vertexes is the same as the theoretic number of vertexes. If so, go on with the subsequent blocks. If not, discard the currently detected image, and go to block 021 to read the image next to the currently detected image.

This embodiment uses a vertex as feature information to illustrate the operation of detecting feature information. However, those skilled in the art understand that feature information may be color feature information of an image, brightness feature information of image, or geometric feature information of an image. More specifically, geometric feature information may be edge or profile, vertex, straight line, circle, ellipse, or rectangle, and so on. If the template of the image is a checkerboard, the detected feature information may be a vertex, and the subsequent step 023 is to judge whether the number of actually detected vertexes is the same as the actual number of vertexes in the checkerboard. If such is the case, it indicates that the obtained image has distinct feature information; if not, the obtained image is incomplete and needs to be discarded. If the template of the image is concentric circles, the detected feature information may be the number of circles, and the subsequent step is to judge whether the number of actually detected concentric circles is the same as the actual number of concentric circles in the template. If such is the case, it indicates that the obtained image has distinct feature information; otherwise, the obtained image is incomplete and needs to be discarded. In practice, different feature information may be detected for the image. The color feature information and the brightness feature information may be embodied as grayscale feature information, binarized image feature information, and color change feature information. The geometric feature information of an image may be a common straight line, circle, arc, ellipse, hyperbola, or vertex feature information (a vertex is also known as a feature point or key point). As regards the meaning of the vertex, the brightness or chroma or gradient of the vertex changes acutely or sharply in a certain scope of the vertex. For example, a peak of a black rectangle in a white background is a vertex, and a point in a black and white checkerboard is a vertex. Nevertheless, a typical image is the template. Those skilled in the art understand that an image may be an ordinary object other than a template, for example, an image obtained by photographing of a cup on a table. In this case, the detected feature information is feature information corresponding to the shape of the cup. For ease of illustration, the following takes a checkerboard and concentric circles as examples, which should not be construed as limitation to the present invention.

In the foregoing embodiment, cropping of an image detected as having feature information includes obtaining coordinates of feature information of the image according to the obtained feature information, obtaining the maximum value and the minimum value of the X-coordinate and the Y-coordinate of each point corresponding to the feature information, and obtain the image suitable for cropping, and obtaining the boundary formed by the points corresponding to the feature information according to the coordinates of the points corresponding to the feature information of the image. The area outside the boundary formed by the points is cut away and the inside image suitable for cropping. A cropped image can be obtained according to only the image information inside the boundary formed by the points.

Figure 5:
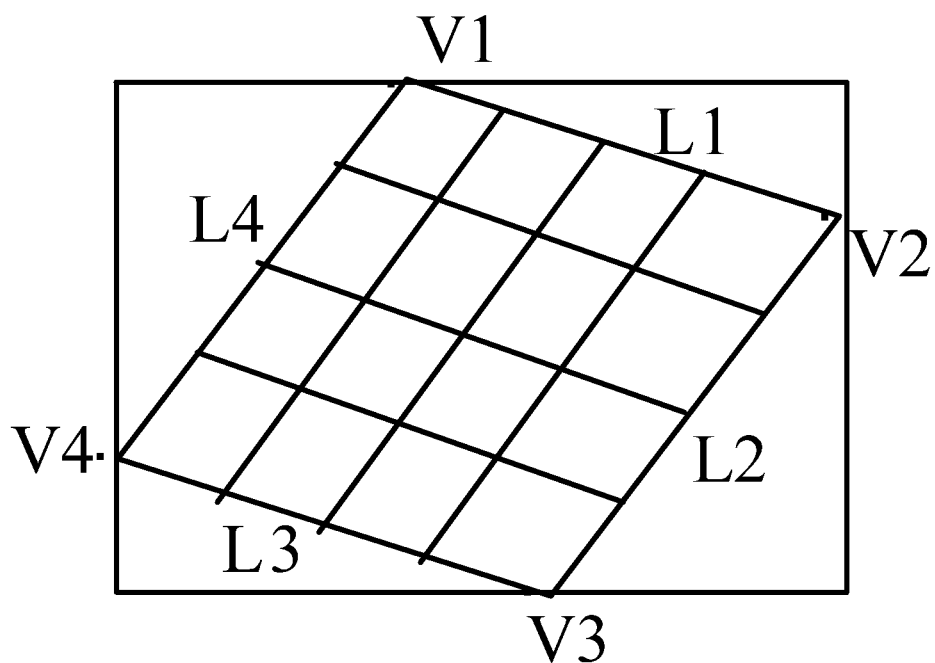
FIG. 5 shows image cropping in the first embodiment of the present invention.
Figure 6:
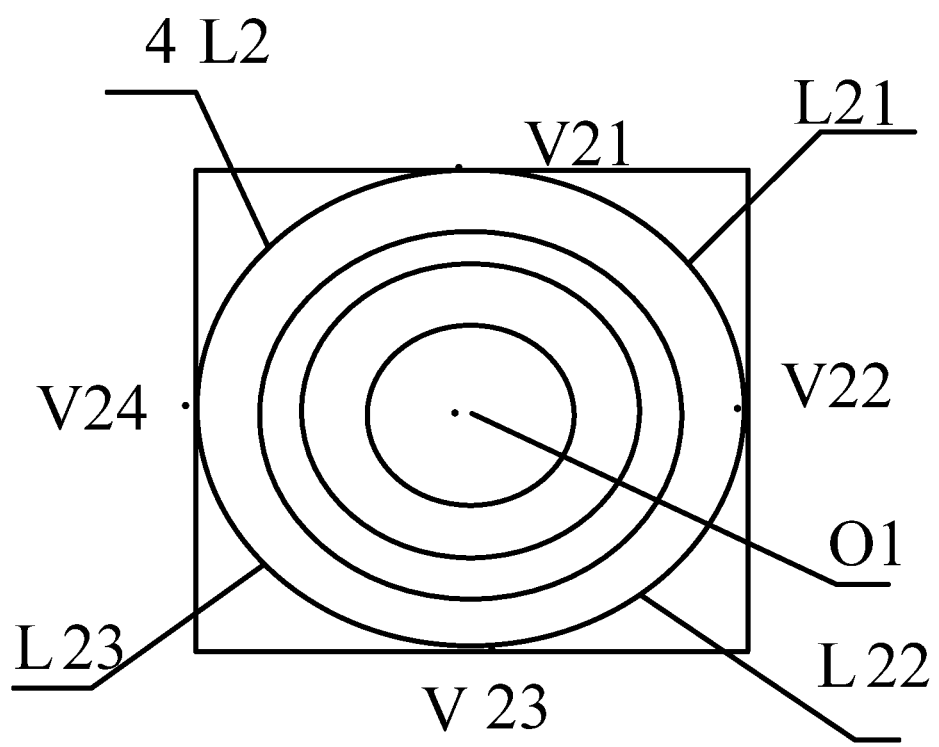
FIG. 6 shows image cropping in the second embodiment of the present invention.

The image cropping operation is shown in FIG. 5 and FIG. 6. FIG. 5 shows the first embodiment of image cropping. In this embodiment, it is assumed that the image template is a checkerboard.

If the image template is a checkerboard, four vertexes are detected through the feature information detection. The image may be cropped according to the detected vertex feature information, and the checkerboard is reserved to the utmost. As shown in FIG. 5, the cropping operation includes the following steps.

(1) Obtain coordinates of four vertexes V1-V4 of the detected checkerboard.

(2) Obtain the maximum value (MaxX) and the minimum value (MinX) of the X-coordinate of the four vertexes. As shown in FIG. 5, the maximum value is the X-coordinate of V2 and the minimum value is the X-coordinate of V4.

Obtain the maximum value (MaxY) and the minimum value (MinY) of the Y-coordinate of the four vertexes. As shown in FIG. 5, the maximum value is the Y-coordinate of V1 and the minimum value is the Y-coordinate of V3.

(3) Obtain the image suitable for cropping according to step (2). For example, the outermost rectangle in FIG. 5 is the image suitable for cropping.

(4) According to the four vertexes V1, V2, V3, and V4, create a coordinate equation of four edges L1, L2, L3, and L4 which make up a rectangle V1V2V3V4.

(5) According to the equation of the four edges, set black for all image points inside the image suitable for cropping and outside the boundary of the rectangle formed by the four edges.

(6) Obtain a final cropped image which reserves only the internal image information inside the boundary formed by the four edges.

Figure 8:
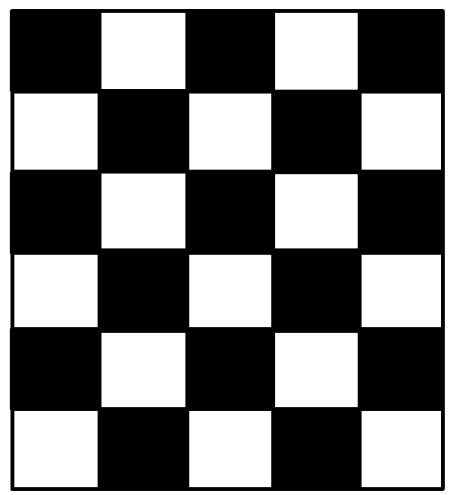
FIG. 8 shows a cropped image in an image processing method in an embodiment of the present invention.
Figure 9:
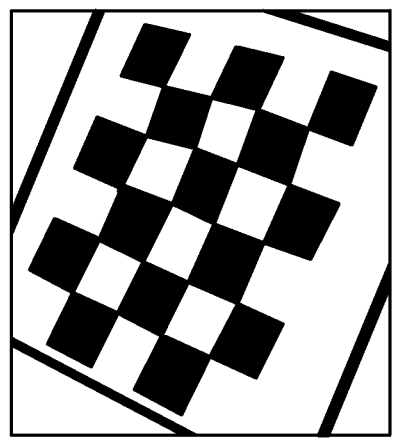
FIG. 9 shows an uncropped image in an image processing method in an embodiment of the present invention.

More specifically, see the cropped image in FIG. 8 and the uncropped image in FIG. 9. As revealed by FIG. 9, the effective percentage of the checkerboard to the whole image in the uncropped image is small. The cropped image in FIG. 8 reserves only the checkerboard that includes all feature information, which increases the percentage of feature information to the image significantly.

FIG. 6 shows image cropping in the second embodiment of the present invention. In this embodiment, it is assumed that the image template is concentric circles.

If the image template is concentric circles, four concentric circles are detected through the feature information detection, as shown in FIG. 6. The image may be cropped according to the detected feature information of concentric circles, and the image template is reserved to the utmost. As shown in FIG. 6, the cropping operation includes the following steps.

(1) Obtain coordinates of the circular boundary of the outmost concentric center among the four detected concentric circles.

(2) Obtain the maximum value (MaxX) and the minimum value (MinX) of the X-coordinate of the circular boundary of the outermost concentric circle. As shown in FIG. 6, the maximum value is the X-coordinate of V24 and the minimum value is the X-coordinate of V22.

Obtain the maximum value (MaxY) and the minimum value (MinY) of the Y-coordinate of the circular boundary of the outermost concentric circle. As shown in FIG. 6, the maximum value is the Y-coordinate of V21 and the minimum value is the Y-coordinate of V23.

(3) Obtain the image suitable for cropping according to step (2). For example, the rectangle in FIG. 5 is the image suitable for cropping.

(4) According to the four vertexes V1, V2, V3, and V4, create four arcs L21, L22, L23, and L24 which make up a circle.

(5) Obtain the boundary of the circle according to step (4), set all image points inside the images suitable for cropping in step (2) and outside the boundary of the circle to be black.

(6) Obtain a final cropped image which reserves only the image information of the four concentric circles.

Those skilled in the art understand that for different feature information, the corresponding image cropping operation differs. The feature information may be vertexes, lines, circles, ellipses, and rectangles, and the corresponding boundary and image cropping are of a little difference.

Figure 7A:
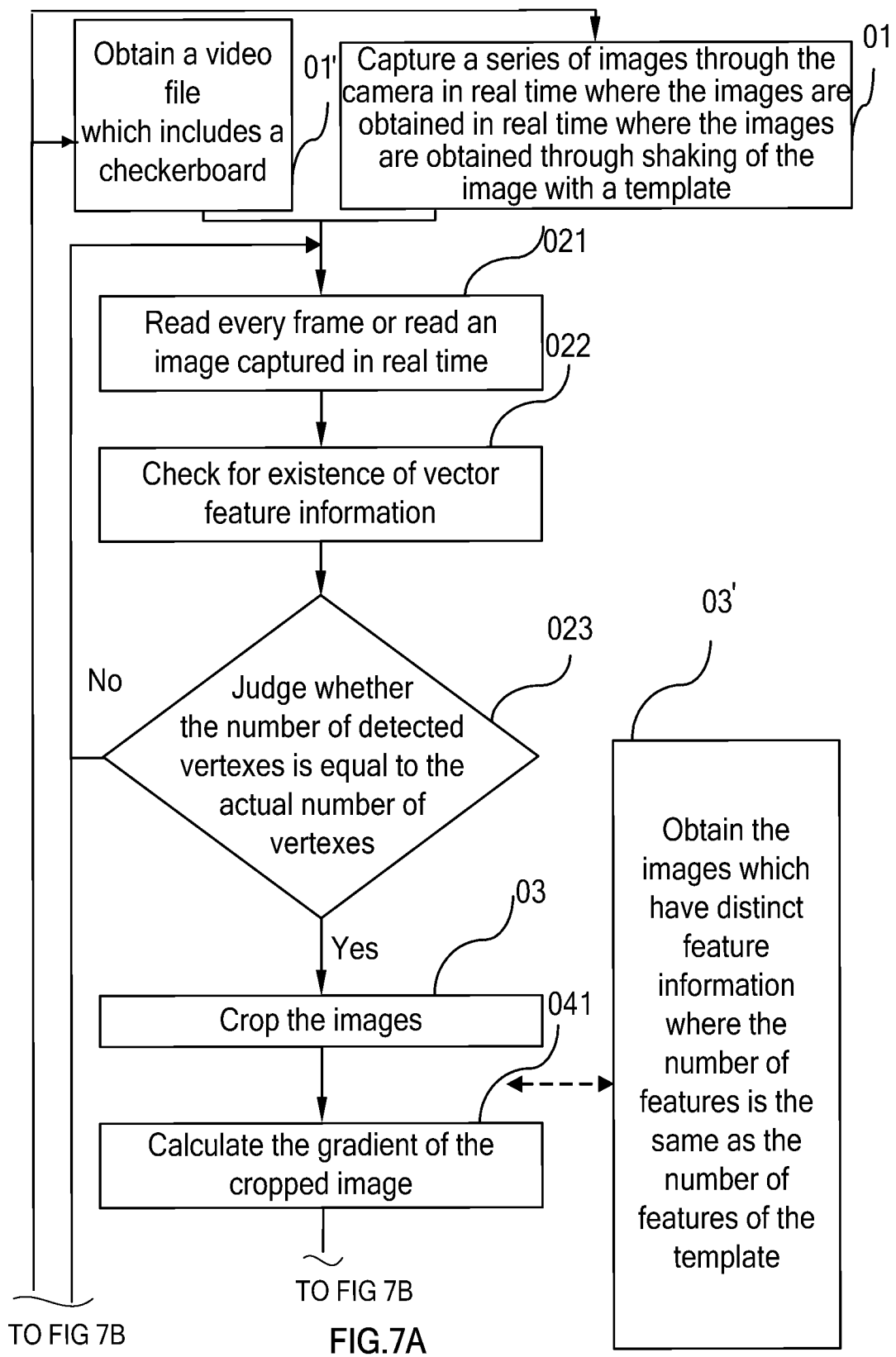
FIG. 7, which is shown as FIGS. 7A and 7B, is a flowchart of an image processing method in the fourth embodiment of the present invention.
Figure 7B:
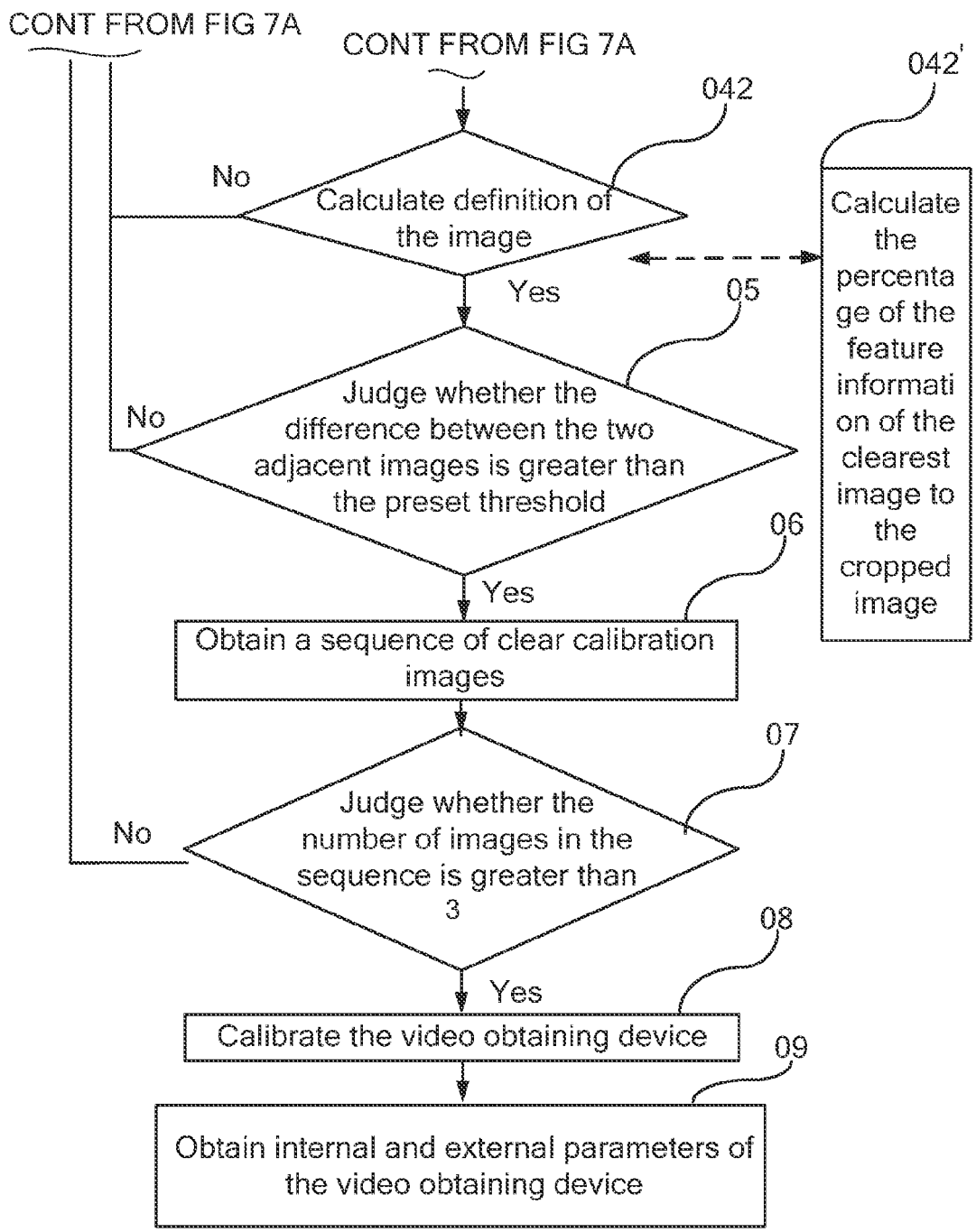

FIG. 7 is a flowchart of an image processing method in the four embodiment of the present invention. This embodiment gives a detailed flowchart. As shown in FIG. 7, still taking the checkerboard image template as an example, the method provided in this embodiment includes the following blocks.

Block 01': Obtain a video file which includes a checkerboard. This block can further includes powering on the camera to be ready for photographing; letting one person hold a checkerboard and shake the checkerboard template in front of the camera; and obtaining a video file which includes the checkerboard. The obtained image may also be an image detected in real time, as obtained in block 01.

Block 01: Capture by the camera a series of images in real time when the image with a template is shaking This block can further include powering on the camera to be ready for photographing; letting one person stand in front of the camera and shake a checkerboard. The images captured in real time by using the camera, and detecting and processing the images and a series of images is obtained.

Through block 01', a video file is obtained by photographing, and is stored in a computer hard disk in a format similar to AVI. The video file includes multiple images. Through block 01, continuous frames (the same image) are obtained through real-time photographing, and are stored in the computer cache. Nevertheless, the image may be obtained by other means. For example, one person moves while operating the camera, and the checkerboard is stationary; or an image is obtained by photographing directly without checkerboard. However, the man-caused factors may exist in the photographing, for example, the camera is shaking, or the camera incurs unintentional interference. Consequently, the image is not clear, and is not suitable for calibration.

After one or more frames/pages of images are obtained, subsequent blocks are performed, including the following.

Block 021: Read every frame or read an image captured in real time.

Block 022: Check for vertex feature information.

Block 023: Judge whether the number of detected vertexes is equal to the actual number of vertexes; if so, go to block 03; otherwise, go to block 021.

Block 03: Crop the image, namely, block 03' shown in FIG. 7: crop the image according to the checkerboard in the position of the detected four vertexes, and obtain the images that have distinct feature information, where the number of the images is consistent with the feature information of the template. For details, see the description about the embodiments shown in FIG. 5 and FIG. 6.

Block 041: Calculate the gradient of the cropped image.

Block 042: Calculate and check whether the image is clear. If so, go to block 05 to detect difference; otherwise, go to block 021 to read the next image.

Block 041 and block 042 are blocks of judging definition of the image, and are to judge whether the image is clear or in focus according to content of the high frequency components of edge information in the feature information of the image. The operation of detecting definition of the image is detailed below.

Figure 10:
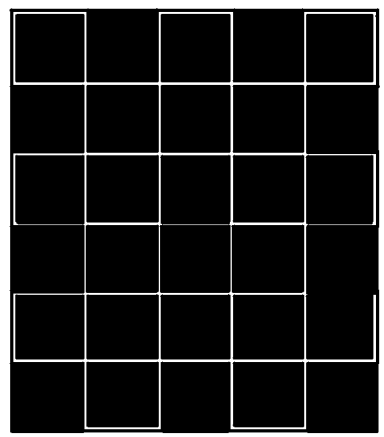
FIG. 10 shows a gradient map of a cropped image in an image processing method in an embodiment of the present invention.

A. Obtain a cropped image according to block 03 in this embodiment. If the image is clear, gray the cropped image (shown in FIG. 8), and calculate the gradient value (for example, perform Laplace transformation for the image) of each point of the cropped image. As a result, output a grayscale image which includes only the edge information, as shown in FIG. 10.

B. Calculate the absolute value of the gradient value of the image. Sometimes the gradient is not positive, and the value of each pixel point of the grayscale image ranges from 0 to 255. Therefore, the absolute value of the gradient value needs to be calculated out, and converted into a grayscale image.

C. Make statistics to obtain the total sum of pixels of white lines of edge information in the grayscale image corresponding to the clear image, or divide the pixel sum by the size of the cropped image (namely, total number of pixels of the image), and set a threshold T1 as a definition criterion, where T1 is the total sum of white pixel points or the percentage of the total sum of white pixel points to the whole image.

D. Enlarge the threshold. As shown in FIG. 10, noise points exist in each white grid. Therefore, denoising may be performed, or the threshold T1 needs to be multiplied properly. For different scenes, the enlarging multiple differs. If the denoising effect is very good, no enlarging is required. If the denoising effect is poor and there are many noise points, the enlarging multiple is about two-fold.

E. Binarize the cropped image, and obtain the total sum of white pixel points of all edge information in the binarized image or the percentage of the edge information to the whole image.

F. Compare the definition threshold T1 with the total sum of white pixel points of all edge information in the binarized image or the percentage of the edge information to the whole image. If the latter is greater than T1, the image is vague, and needs to be discarded; otherwise, the image is clear and needs to be reserved.

Figure 11:
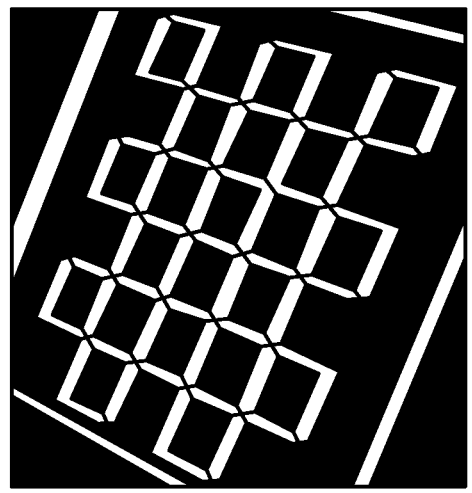
FIG. 11 shows a gradient map of an uncropped vague image in an image processing method in an embodiment of the present invention.

The edge information (namely, display of the gradient map) in the grayscale image is shown in FIG. 10 and FIG. 11. FIG. 10 is a grayscale image of a clear image, and FIG. 10 is a grayscale image corresponding to a vague image. Evidently, the lines in the grayscale image corresponding to the clear image are thin, and the lines in FIG. 11 are thick. If the total sum of white pixel points calculated out in step F is greater than the preset threshold, there are relatively many white pixel points in the image, and the lines are thick, as shown in FIG. 11. In this case, the corresponding image is vague, and needs to be excluded for subsequent detection.

The block of judging definition of the image is equivalent to block 042' in FIG. 7. The preset definition criterion is the percentage of the feature information (such as edge or profile information) corresponding to the clearest image template to the cropped image. If the actually obtained cropped image is out of the set definition criterion, the image is vague. Alternatively, the total number of white pixel points of feature information in the cropped image is compared with the set definition criterion. If the total sum of white pixel points exceeds the set definition criterion, the image is vague, and the corresponding lines are thick, as shown in FIG. 11. After the image is determined as clear, the following blocks occur.

Block 05: Judge whether the difference between two adjacent images is greater than a preset threshold; if so, go to block 06; otherwise, go to block 021.

As described in the embodiments in FIG. 1 to FIG. 3, the detection of difference between two adjacent images may occur after the operation of judging definition of the images or after the operation of obtaining the image or occur at the same time. In the difference detection, a proper threshold is set, and a judgment is made about whether the two adjacent images are distinctly different; if the two images are distinctly different, the two adjacent images are reserved for undergoing subsequent detection and judgment; otherwise, one of the two adjacent images is discarded. The difference between two adjacent images is detected in order to prevent the detected images from staying static and unchanged. In this embodiment, the operation of judging whether the difference between two adjacent images is greater than the preset threshold includes these steps.

1. Obtain information about vertexes of two adjacent images.
2. Calculate the difference between the coordinate of the vertex in the corresponding position of the previous image and that of the next image.
3. Calculate the sum of the coordinate differences of all corresponding vertexes, and calculate the mean value of them. Set a threshold of this mean value. If the difference exceeds the threshold, it indicates that the two adjacent images are distinctly different and both need to be reserved; otherwise, one of the images needs to be discarded.

Block 06: Obtain a sequence of clear calibration images, namely, multiple images meeting conditions (feature information exists, and the images are clear and cropped).

Block 07: Judge whether the number of images in the image sequence is greater than 3; if so, go to block 08; otherwise, go to block 01 or 01' to obtain more images. If a two-dimensional or three-dimensional template is used to calibrate the camera, judge whether the final number of the effective calibration images conforms to the required number of calibration images. In this embodiment, the required number of calibration images is set to 3.

Block 08: Calibrate the video obtaining device according to the three clear images obtained and the corresponding feature information.

Block 09: Obtain internal and external parameters of the video obtaining device.

The image definition judgment in this embodiment is based on the Fourier optical theory: The extent of definition or focusing of an image primarily depends on the number of high frequency components in the light intensity distribution. Small number of high frequency components lead to vague images and large number of high frequency components lead to clear images. This embodiment uses the content of high frequency components in the light intensity distribution of an image as a main basis of assessing the definition or focusing of the image.

Because an image has an edge part, when the camera is in full focus, the image is clear, and the most high frequency components that include the edge information exist; when the camera is out of focus, the image is vague, and less high frequency components exist. Therefore, the number of high frequency components of edge information of the image can be used as a basis for judging whether the image is clear or in focus.

The definition judgment in this embodiment is different from the method of judging image definition or automatic focusing in the prior art. In the method of judging image definition or automatic focusing in the prior art, a series of images are obtained by photographing of the same scene, and the clearest image is found among them for adjusting the focal length of the camera automatically. That is, in the prior art, comparison is made between a series of images, and the clearest image is selected among them as a basis for judging whether the focal length is adjusted to the ideal location. In this embodiment, in the image processing before video calibration, a judgment is made about whether an image alone is clear, or whether the part with distinct feature information in the image is clear, regardless of whether other parts of the image are clear. Meanwhile, the image definition judgment in this embodiment is not based on a series of images, but is based on a single image alone.

Figure 12:
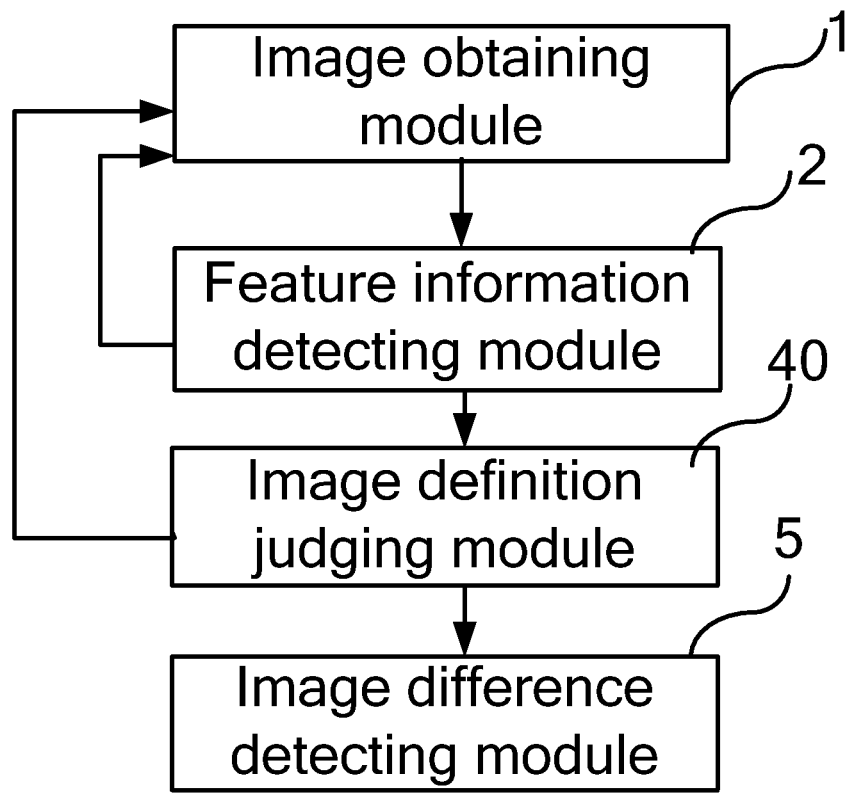
FIG. 12 shows an image processing system in the first embodiment of the present invention.

FIG. 12 shows an image processing system in the first embodiment of the present invention. As shown in FIG. 12, the system in this embodiment includes an image obtaining module 1 that is adapted to obtain video images or capture a series of images in real time. A feature information detecting module 2 is connected to the image obtaining module 1 and adapted to detect feature information of the obtained video images or the series of images and obtain images that have distinct feature information. An image definition judging module 40 is connected to the feature information detecting module 2 and the image obtaining module 1, and is adapted to perform definition-related treatment for the images that have the feature information, compare definition of each image with a preset definition criterion, and reserve clear images. An image difference detecting module 5 is connected with the image definition judging module 40 and adapted to store a current clear image if difference between a current image and a previous stored image is greater than a preset threshold.

Figure 13:
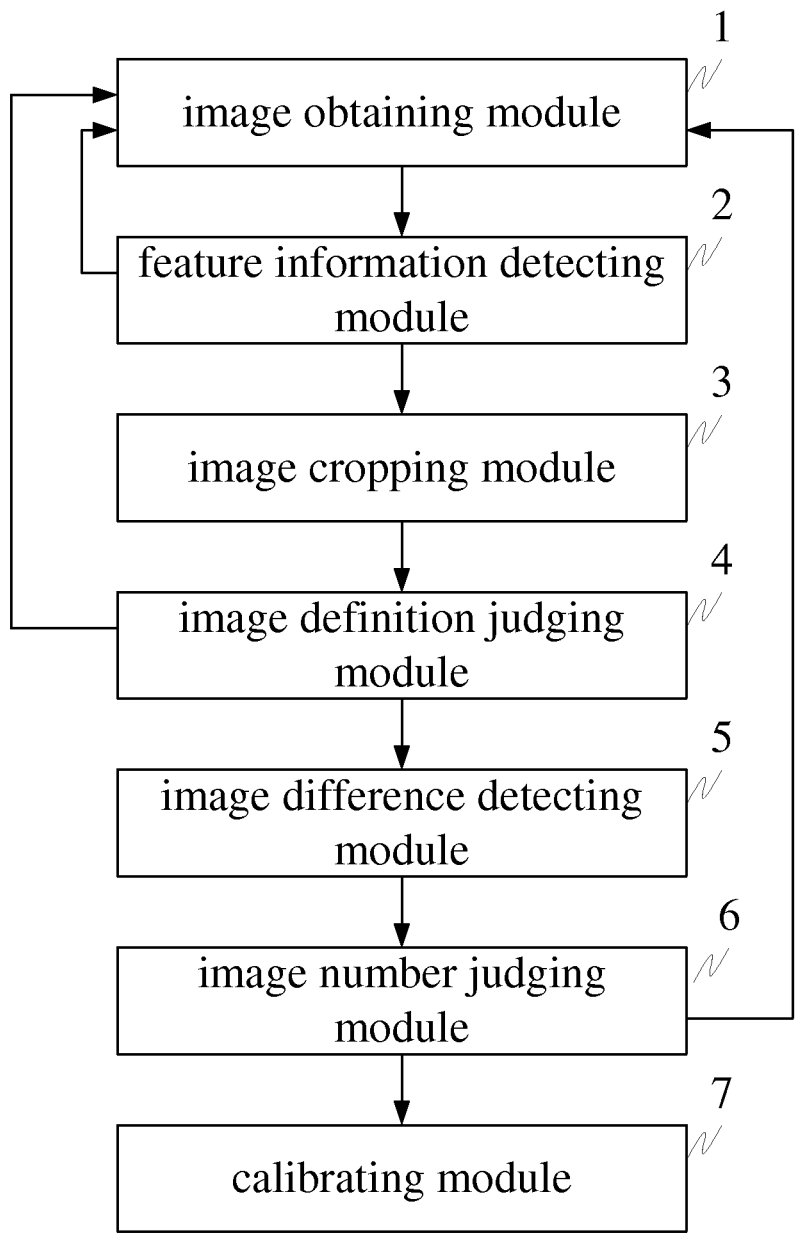
FIG. 13 shows an image processing system in the second embodiment of the present invention.

FIG. 13 shows an image processing system in the second embodiment of the present invention. As shown in FIG. 13, the system in this embodiment includes an image obtaining module 1 that is adapted to obtain video images or capture a series of images in real time. A feature information detecting module 2 is connected to the image obtaining module 1 and adapted to detect feature information of the obtained video images or the series of images and obtain images that have distinct feature information. An image cropping module 3 is connected to the feature information detecting module 2 and adapted to crop the images that have the feature information. An image definition judging module 4 is connected to the image cropping module 3 and the image obtaining module 1, and adapted to perform definition-related treatment for the cropped images, compare definition of the image with a preset definition criterion, and reserve the clear image. An image difference detecting module 5 is connected to the image definition judging module 4, and adapted to judge whether difference between a current image and a previous stored image is less than a preset threshold. If so, the image difference detecting module will reserve one of the images; otherwise, it store the current image. An image number judging module 6 is connected to the image difference detecting module 5 and the image obtaining module 1, and adapted to detect the number of stored images, and make the image obtaining module select the next image for subsequent operations if the number of stored images does not reach the set number.

The system in this embodiment may further include: a calibrating module 7, connected with the image number judging module 6, and adapted to: obtain internal and external parameters of the video obtaining device according to the set number of obtained clear images and the corresponding feature information, and calibrate the video obtaining device.

Figure 14:
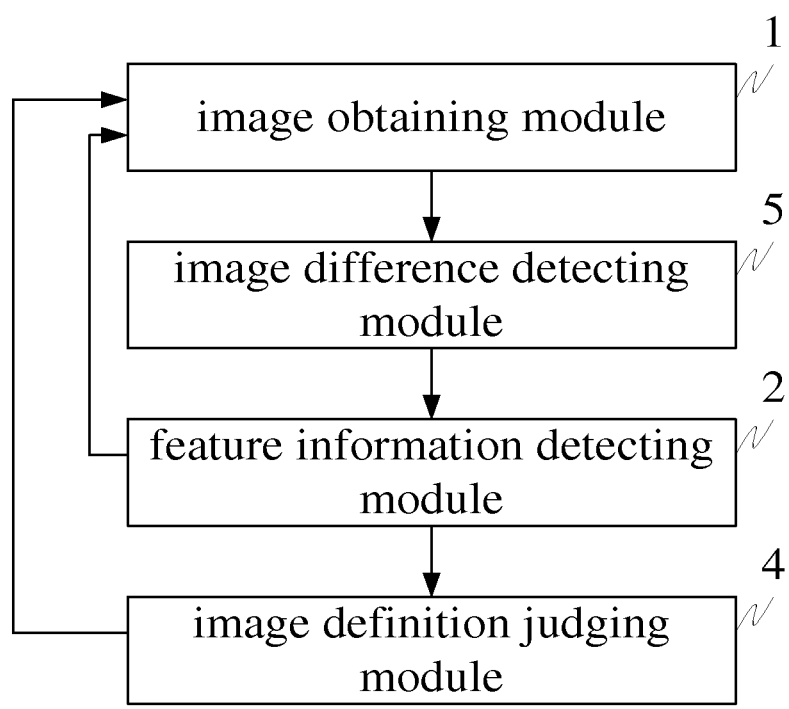
FIG. 14 shows an image processing system in the third embodiment of the present invention.

FIG. 14 shows an image processing system in the third embodiment of the present invention. As shown in FIG. 14, the system in this embodiment includes an image obtaining module 1 that is adapted to obtain video images or capture a series of images in real time. An image difference detecting module 5 is connected to the image obtaining module 1, and adapted to store two adjacent images when difference between the two adjacent images is greater than a preset threshold. A feature information detecting module 2 is connected to the image obtaining module 1, and adapted to detect feature information of the obtained video images or the series of images and obtain images that have distinct feature information. An image definition judging module 4 is connected to the feature information detecting module 2 and the image obtaining module 1, and adapted to perform definition-related treatment for the images that have the feature information and compare definition of each image with a preset definition criterion. When a current image is unclear, the image definition judging module will discard the current image so that the image obtaining module continues to select a next image.

Figure 15:
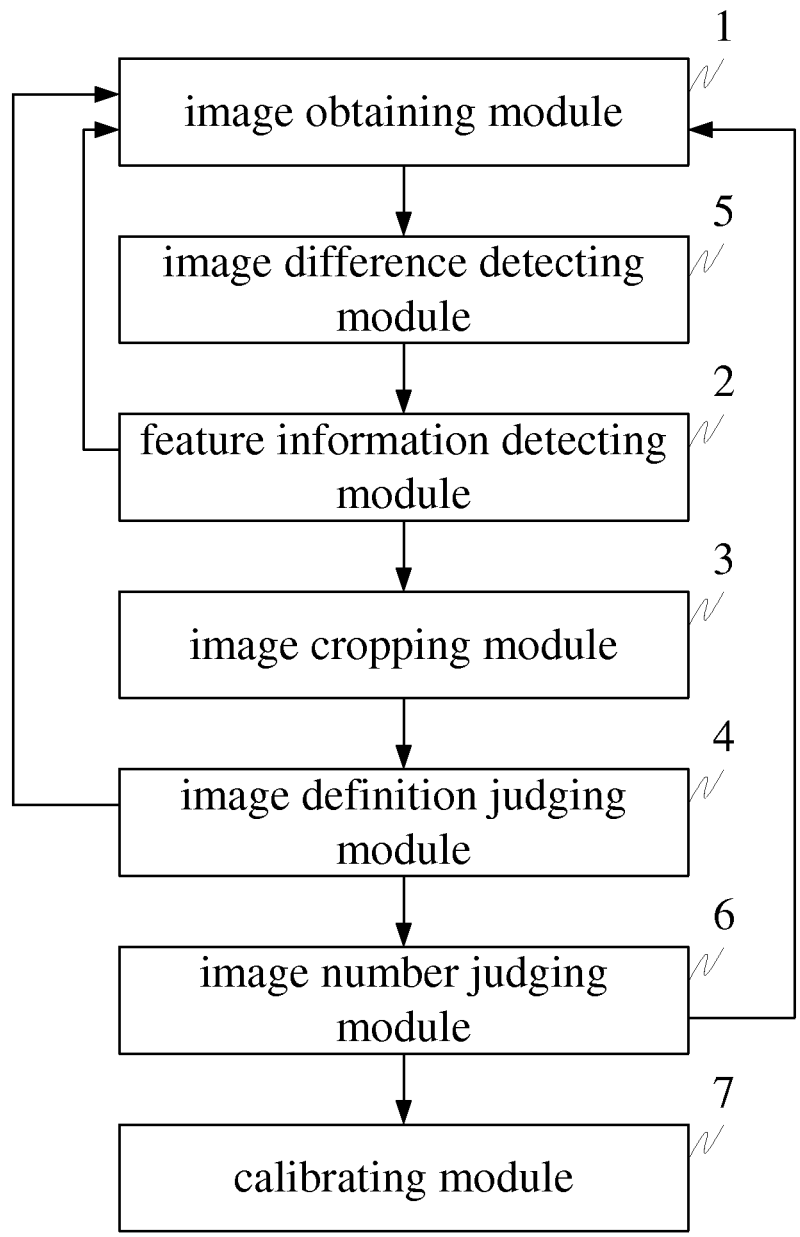
FIG. 15 shows an image processing system in the fourth embodiment of the present invention.

FIG. 15 shows an image processing system in the fourth embodiment of the present invention. As shown in FIG. 15, the system in this embodiment includes an image obtaining module 1 that is adapted to obtain video images or capture a series of images in real time. An image difference detecting module 5 is connected to the image obtaining module 1, and adapted to store two adjacent images when difference between the two adjacent images is greater than a preset threshold. A feature information detecting module 2 is connected to the image obtaining module 1, and adapted to detect feature information of the obtained video images or the series of images and obtain images that have distinct feature information. An image cropping module 3 is connected to the feature information detecting module 2 and adapted to crop the images that have the feature information. An image definition judging module 4 is connected to the image cropping module 3 and the image obtaining module 1, and adapted to perform definition-related treatment for the cropped images, compare definition of the image with a preset definition criterion, and reserve the clear image. An image number judging module 6 is connected with the image definition module and the image obtaining module 1, and adapted to detect the number of stored images, and make the image obtaining module select the next image for subsequent operations if the number of stored images does not reach the set number.

The system in this embodiment may further include a calibrating module 7, connected with the image number judging module 6, and adapted to obtain internal and external parameters of the video obtaining device according to the set number of obtained clear images and the corresponding feature information, and calibrate the video obtaining device.

The embodiments in FIG. 12 to FIG. 15 correspond to the method embodiments in FIG. 1 to FIG. 7, and provide the functions and effects similar to the embodiments in FIG. 1 to FIG. 7, and implement image preprocessing to facilitate subsequent calibration operation.

The present invention has different embodiments. The technical solution under the present invention is described above with reference to FIG. 1 to FIG. 15, but the present invention is not limited to the method processes or system structures described above. Persons of ordinary skill in the art understand that the implementation solutions described above are only preferred and exemplary solutions.

A person having ordinary skill in the art may understand that all or part of the steps of the method according to the embodiments of the present invention may be implemented by a program instructing relevant hardware. The program may be stored in a computer readable storage medium. When the program runs, the steps of the method according to the embodiments of the present invention are performed. The storage medium may be a Read-Only Memory (ROM), a Random Access Memory (RAM), a magnetic disk, or a Compact Disk Read-Only Memory (CD-ROM).

It should be noted that the above embodiments are merely provided for elaborating the technical solutions of the present invention, but not intended to limit the present invention. Although the present invention has been described in detail with reference to the foregoing embodiments, it is apparent that person having ordinary skill in the art may make modifications to the technical solutions described in the above embodiments, or may make some equivalent replacements to some of the technical features without making the nature of the corresponding technical solutions depart from the spirit and scope of various embodiments of the invention.

What is claimed is:

1. An image processing method, comprising:
capturing two images;
detecting a difference between the two images;
reserving one of the two images when the difference is less than a preset threshold;
detecting feature information of one of the two images;
performing definition-related treatment for the image having detected feature information; and
reserving a clear image according to the definition-related treatment;
wherein, before performing the definition-related treatment, the method further comprises cropping the image having the detected feature information so as to increase a percentage of the detected feature information to the whole image;
wherein performing the definition-related treatment, and reserving the clear image according to the definition-related treatment comprises at least one of:
graying the cropped image;
calculating a gradient value of the grayed image;
outputting a grayscale image which comprises edge information;
setting a grayscale image threshold as a definition criterion according to the grayscale image;
binarizing the cropped image;
obtaining a binarized threshold corresponding to the binarized image;
determining that the image is clear and reserving the image if the binarized threshold corresponding to the binarized image is less than the grayscale image threshold; and
graying the cropped image;

calculating a gradient value of the grayed image;

outputting a grayscale image which comprises edge information;

using a total sum of white pixel points of the edge information of the grayscale image or a percentage of the edge information to the whole image as a definition criterion;

binarizing the cropped image;

obtaining a total sum of white pixel points of the edge information in the binarized image or the percentage of the edge information to the whole image;

determining that the image is clear and reserving the image if the total sum of the white pixel points of the edge information in the binarized image or the percentage of the edge information to the whole image is less than the definition criterion.

2. The image processing method according to claim 1, wherein, after reserving the clear image, the method further comprises capturing additional images if a number of the reserved images does not reach a set number.

3. The image processing method according claim 1, further comprising performing camera calibration according to the reserved clear image and corresponding feature information, and obtaining internal and external parameters of a camera.

4. The image processing method according to claim 1, wherein the feature information comprises one or more of color feature information, brightness feature information, and geometric feature information.

5. The image processing method according to claim 4, wherein the color feature information and the brightness feature information comprise at least one of grayscale feature information, binarized image feature information, and color change feature information.

6. The image processing method according to claim 4, wherein the geometric feature information comprises at least one of edge, profile, vertex, straight line, circle, arc, ellipse, rectangle and curve feature information.

7. The image processing method according to claim 1, wherein detecting feature information comprises:
reading the image;
detecting the feature information of the image; and
judging whether a number of actually detected feature information is the same as a theoretic number of feature information and, if so, proceeding with subsequent operations, otherwise, discarding the detected image, and detecting an image next to the detected image.

8. The image processing method according to claim 1, wherein cropping the image comprises:
obtaining coordinates of the feature information of the image;
obtaining a maximum value and a minimum value of an X-coordinate and a Y-coordinate of each point corresponding to the feature information, and obtaining an image suitable for cropping;
obtaining a boundary formed by points corresponding to the feature information according to the coordinates of the points corresponding to the feature information of the image;
cutting away an area outside the boundary formed by the points and outside an image suitable for cropping; and
obtaining a cropped image according to image information inside the boundary formed by the points.

9. The image processing method according to claim 1, wherein detecting the difference between the two images comprises:
obtaining information about feature points of the two images;
calculating coordinate differences between the feature points in all corresponding positions, and calculating a mean value of coordinate differences; and
judging whether the mean value is less than a preset threshold; if so, discarding one of the images; otherwise, proceeding with subsequent operations.

10. The image processing method according to claim 1, wherein performing the definition-related treatment comprises:
calculating content of high frequency components in the feature information of the image; and
if the content of the high frequency components in the feature information of the image is greater than a content of the high frequency components corresponding to the preset definition criterion, determining that the image is clear or in focus.

11. An image processing system, comprising:
an image obtaining module adapted to obtain video images or capture a series of images;
an image difference detecting module adapted to detect a difference between two images and to reserve one of the images when the difference is less than a preset threshold;
a feature information detecting module adapted to detect feature information of the obtained video images or the series of images and to obtain images that have distinct feature information; and
an image definition judging module, adapted to perform definition-related treatment for the images that have the feature information; and when an image is unclear, to discard the image so that the image obtaining module continues to select a next image;
the system further comprising an image cropping module, adapted to crop the images that have the feature information;
wherein the image definition judging module adapted to perform definition-related treatment comprises at least one of:
gray the cropped image;
calculate a gradient value of the grayed image;
output a grayscale image which comprises edge information;
set a grayscale image threshold as a definition criterion according to the grayscale image;
binarize the cropped image;
obtain a binarized threshold corresponding to the binarized image;
determine that the image is clear and reserving the image if the binarized threshold corresponding to the binarized image is less than the grayscale image threshold; and
gray the cropped image;
calculate a gradient value of the grayed image;
output grayscale image which comprises edge information;
use a total sum of white pixel points of the edge information of the grayscale image or a percentage of the edge information to the whole image as a definition criterion;
binarize the cropped image;
obtain a total sum of white pixel points of the edge information in the binarized image or the percentage of the edge information to the whole image;
determine that the image is clear and reserving the image if the total sum of the white pixel points of the edge information in the binarized image or the percentage of the edge information to the whole image is less than the definition criterion.

12. The image processing system according to claim 11, further comprising an image number judging module, adapted to detect a number of stored images, and to make the image obtaining module select a next image for subsequent operations if the number of stored images does not reach a set number.

13. The image processing system according to claim 11, further comprising a calibrating module, adapted to obtain internal and external parameters of a video obtaining device according to the obtained clear images and the corresponding feature information, and to calibrate the video obtaining device.

\* \* \* \* \*